(12) United States Patent
Craig

(10) Patent No.: US 8,007,032 B1
(45) Date of Patent: Aug. 30, 2011

(54) ENERGY DISTRIBUTING SIDE STRUCTURE FOR VEHICLE SIDE IMPACT OCCUPANT PROTECTION

(75) Inventor: Ryan Craig, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 12/725,604

(22) Filed: Mar. 17, 2010

(51) Int. Cl.
*B60N 99/00* (2006.01)

(52) U.S. Cl. .............................. 296/187.12; 296/193.05

(58) Field of Classification Search ............ 296/187.03, 296/187.12, 193.05, 193.06, 203.03, 204, 296/205
See application file for complete search history.

(56) References Cited

U.S. PATENT DOCUMENTS

| | | | |
|---|---|---|---|
| 4,673,205 A | 6/1987 | Drewek | |
| 6,676,200 B1 | 1/2004 | Peng | |
| 6,793,274 B2 * | 9/2004 | Riley et al. | 296/187.03 |
| 6,824,204 B2 * | 11/2004 | Gabbianelli et al. | 296/205 |
| 7,090,293 B2 | 8/2006 | Saberan et al. | |
| 7,111,900 B2 | 9/2006 | Chernoff et al. | |
| 2006/0087107 A1 | 4/2006 | Li et al. | |
| 2006/0284044 A1 | 12/2006 | Lawall et al. | |

* cited by examiner

*Primary Examiner* — Lori Lyjak
(74) *Attorney, Agent, or Firm* — Shook, Hardy & Bacon L.L.P.

(57) ABSTRACT

An energy distributing side structure for a vehicle is disclosed. The side structure includes a B-pillar having a wide base and an internal reinforcing tube, a rocker having an internal bulkhead, a rear rocker, and at least one cross-member extending vehicle-inward from the rocker. The cross-member may extend to the vehicle tunnel and may be attached to a tunnel brace. One or more additional cross-members may be provided which also extend vehicle-inward from the rocker and define secondary load paths. By this arrangement loading is transferred to the floor and cross-members of the vehicle during a lateral impact event.

20 Claims, 5 Drawing Sheets

ENERGY DISTRIBUTING SIDE STRUCTURE FOR VEHICLE SIDE IMPACT OCCUPANT PROTECTION

TECHNICAL FIELD

The disclosed invention relates to a side structure for an automotive vehicle. More particularly, the disclosed invention relates to a side structure for a vehicle which incorporates a B-pillar having a wide base and an internal reinforcing tube, a rocker having a bulkhead, at least one cross-member, and rear rocker webbing. According to the side structure of the disclosed invention loading is transferred to the floor and cross-members of the vehicle during an impact event.

BACKGROUND OF THE INVENTION

Side impact events involving automotive vehicles typically include the imposition of dynamic loading to the vehicle body sides. The side impact event imposes severe loading on the structural members of the body. This situation is complicated by the fact that many compact or mid-sized vehicles have low rocker heights that may pass below the bumper of an impacting vehicle, resulting in high door velocities.

Although automotive bodies used in conventional body-on-frame construction have typically used cross members for decades, such cross members have not been involved in the management of crash-related energy. In essence, with a more typical construction, the space between the inner rocker panel and the end of the underbody cross members must first be closed by plastic deformation of the sheet metal bridging between these two structures. This sheet metal is usually flat and comprises a portion of the floor pan.

In an effort to allow the side structure to react in a more controlled manner against laterally imposed loads, transverse tube structures have been provided between the rocker and the tunnel. In the event of a side impact the load is passed to the center of the vehicle. The vehicle front seat is typically attached to the tube structure. This arrangement created a package problem for occupant foot space in the rear seat. On the other hand, if the structure is part of the seat then gaps are required between the structure in the seat and the B-pillar and the center console. This arrangement does not effectively take a load until after the deformation of the vehicle occurs.

Accordingly, as in so many areas of vehicle safety technology, there is room in the art for further advancement in the design of vehicle side structures.

SUMMARY OF THE INVENTION

The disclosed invention provides an alternative arrangement to known side structures for automotive vehicles. The side structure of the disclosed invention generally incorporates a B-pillar having a wide base and an internal tube structure, a rocker having a bulkhead, and at least one cross-member extending laterally across a portion of the body. A load-transferring webbing is provided to the rear of the rocker. According to the side structure of the disclosed invention loading is transferred to the floor and cross-members of the vehicle during an impact event.

The disclosed side structure particularly includes a rocker having an upper portion and a pillar, such as a B-pillar, attached thereto. Inside the rocker structure is a bulkhead. The B-pillar has a wide base and an internal tube structure. Extending vehicle inward from the rocker and laterally across the vehicle body to the tunnel is at least one energy-transferring cross-member. A tunnel brace may be provided over the tunnel and connected with the cross-member to transfer load to the non-impacted side of the vehicle.

The primary load path is from the base of the B-pillar to the cross-member provided to support the back of the front seat. One or more additional secondary load path cross-members may be provided which also extend vehicle inward from the rocker and laterally across the vehicle body, including a cross-member to support the front of the front seat and a rear kick-up cross-member.

A rocker webbing is at the rear of the rocker. The rocker webbing is generally provided to receive the lateral force of an object such as a vehicle body.

The webbing, the cross-members, and the tunnel brace are preferably composed of high strength steel and are more preferably composed of ultra high-strength steel.

The disclosed side structure is able to manage laterally directed loads. On impact, the pillar experiences a bending moment about the rocker to which it is connected. Load is transferred to the cross-member supporting the rear of the front seat and the cross-member transfers the load to the tunnel brace. The tunnel brace in turn transfers load to the non-impacted side of the vehicle. Thus the present device allows the vehicle's body cross-member to react in a more controlled manner against such laterally imposed loads. According to the disclosed configuration the side structure absorbs less energy by distributing load to the surrounding vehicle and thus endures a reduced amount of distortion.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
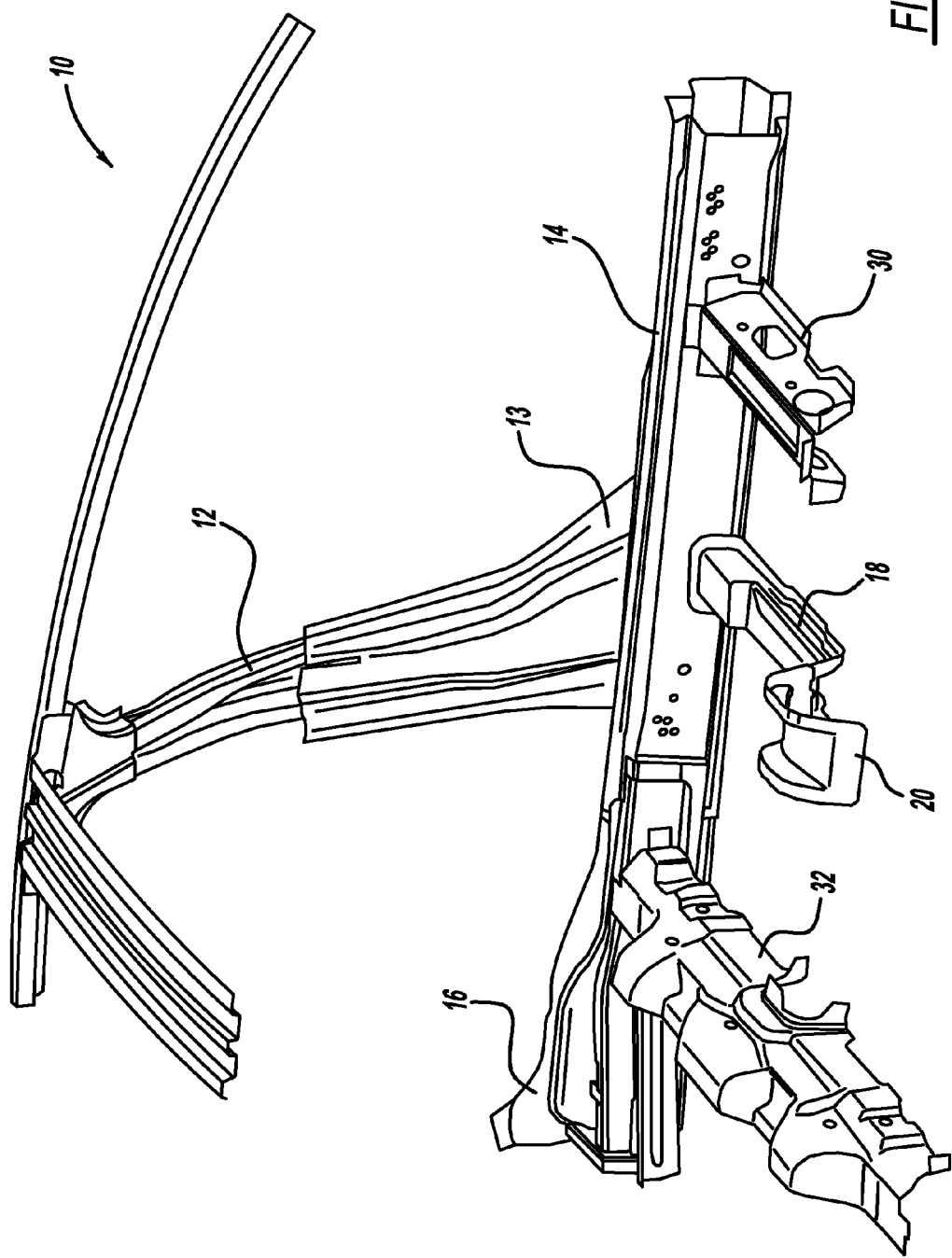
FIG. 1 is a perspective view of the load distributing structure of the disclosed invention illustrating the B-pillar and its wide base, the rocker, the front seat front cross-member, the front seat rear cross-member, the rear kick-up cross-member, and the rear rocker webbing.

In the following figures, the same reference numerals will be used to refer to the same components. In the following description, various operating parameters and components are described for different constructed embodiments. These specific parameters and components are included as examples and are not meant to be limiting.

Figure 2:
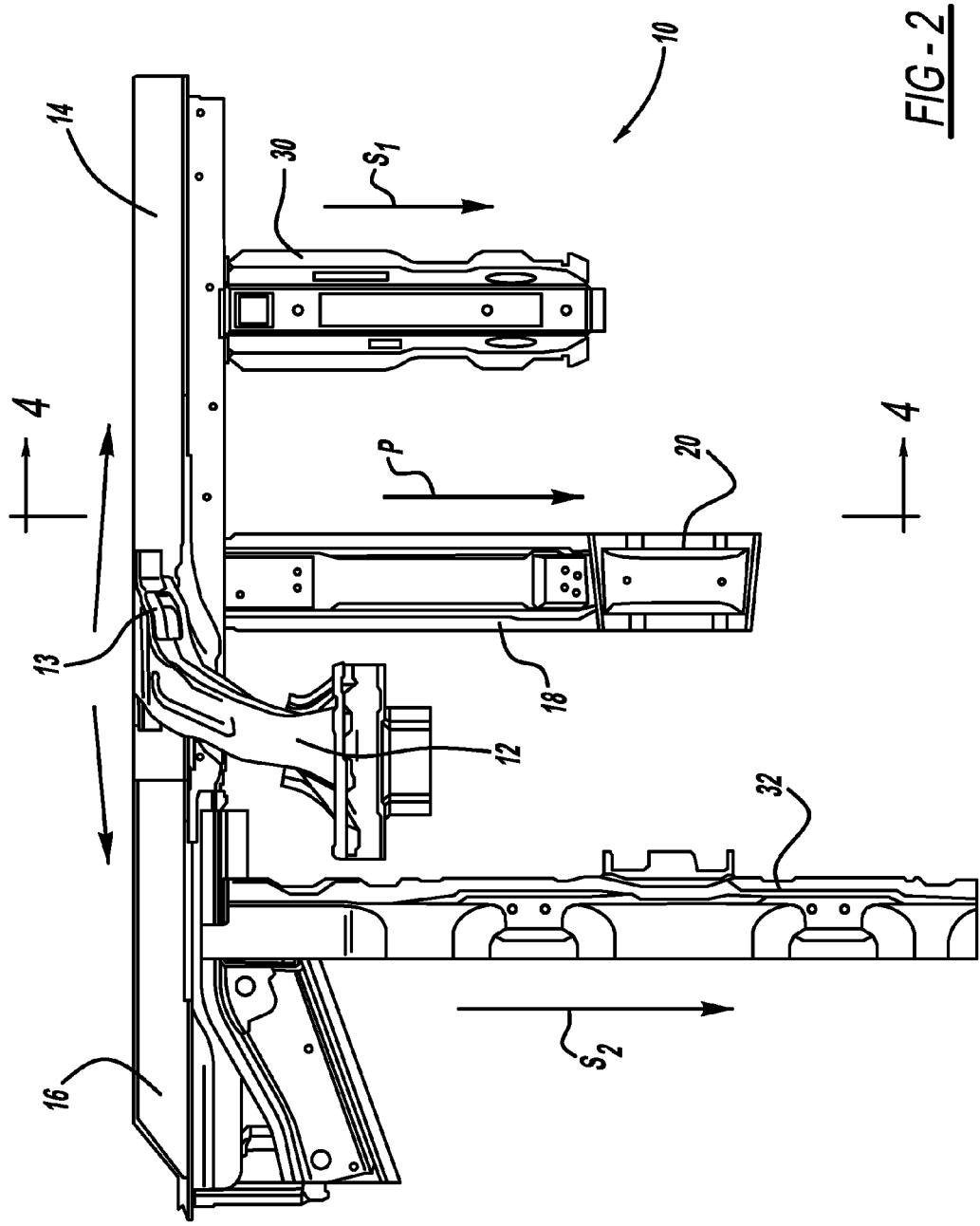
FIG. 2 is a top plan view of the load distributing structure of FIG. 1.
Figure 3:
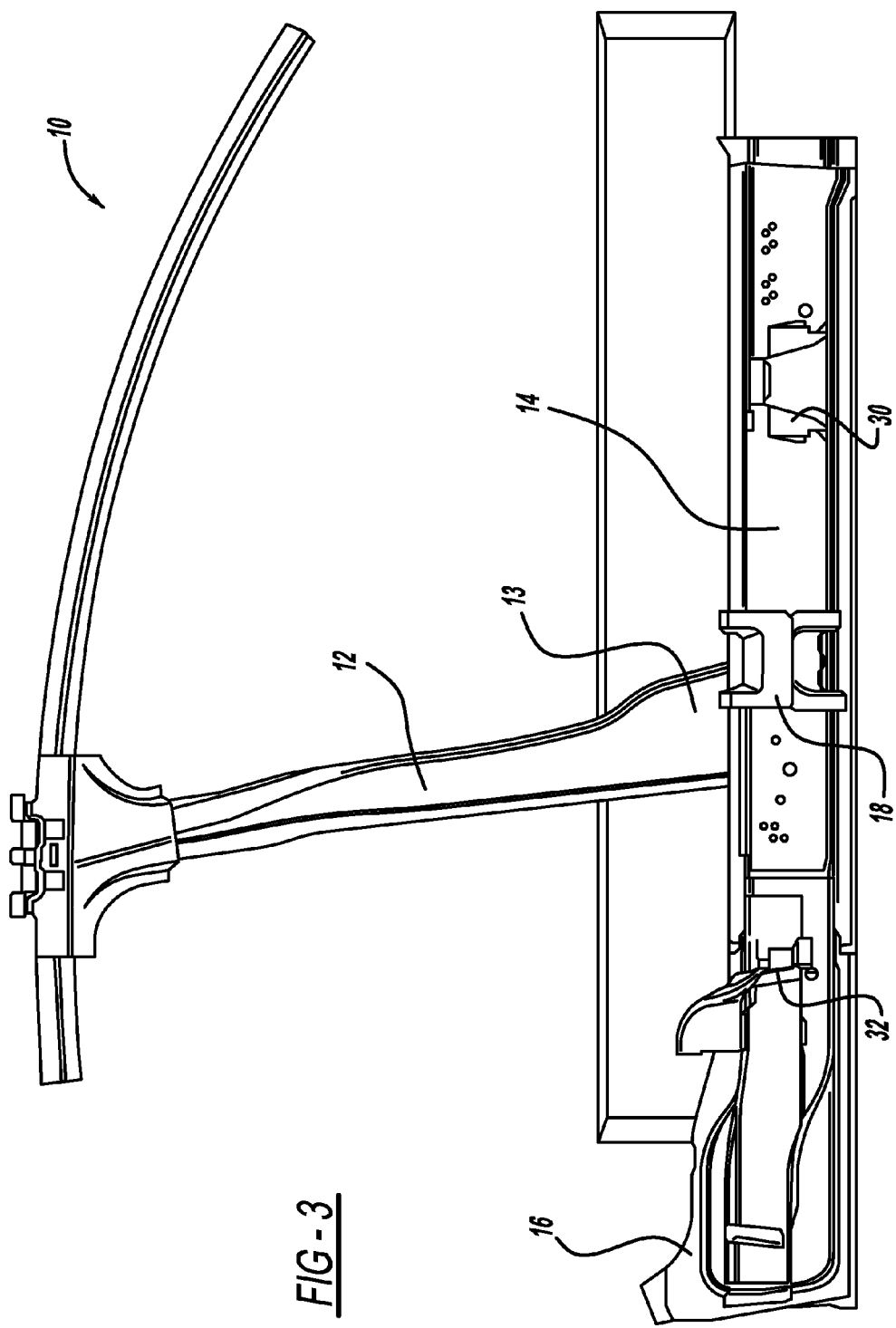
FIG. 3 is a side elevational view of the load distributing structure of FIG. 1 in which the impacting bumper is shown in relation to the B-pillar, the rocker, and rear rocker webbing.

FIG. 1 shows a perspective view of a load distributing structure of the disclosed invention, generally illustrated as 10. FIG. 2 illustrates a top plan view of the load distributing structure 10. FIG. 3 provides a side elevational view of the load distributing structure 10.

With reference to FIGS. 1, 2 and 3, the load distributing structure 10 includes a pillar, such as the illustrated B-pillar 12, and a rocker 14. The B-pillar 12 has a wide base 13. The rocker 14 is preferably composed of high strength steel and is more preferably composed of ultra-high strength steel to minimize rocker twisting in the event of a side impact. The placement and construction of both the pillar 12 and the rocker 14 are set forth for illustrative purposes only and are not intended as being limiting.

A load-carrying rocker webbing 16 is provided at the rear of the rocker 14. Optionally but not necessarily additional load-carrying rocker webbings may be provided.

To provide for effective and managed distribution of load received from the pillar 12, the rocker 14, and the rocker webbing 16 in the event of a lateral impact to the vehicle, at least one cross-member 18 is provided extending laterally vehicle inward from the rocker 14. The cross-member 18 extends between the rocker 14 and a tunnel brace 20 formed over the vehicle tunnel (not shown). The cross-member 18 and the tunnel brace 20 are preferably formed from high strength steel and more preferably are formed from ultra-high strength steel. As is known the cross-member 18 is positioned in the vehicle such that it is able to provide support to the back of the front seat of the vehicle (not shown).

Figure 4:
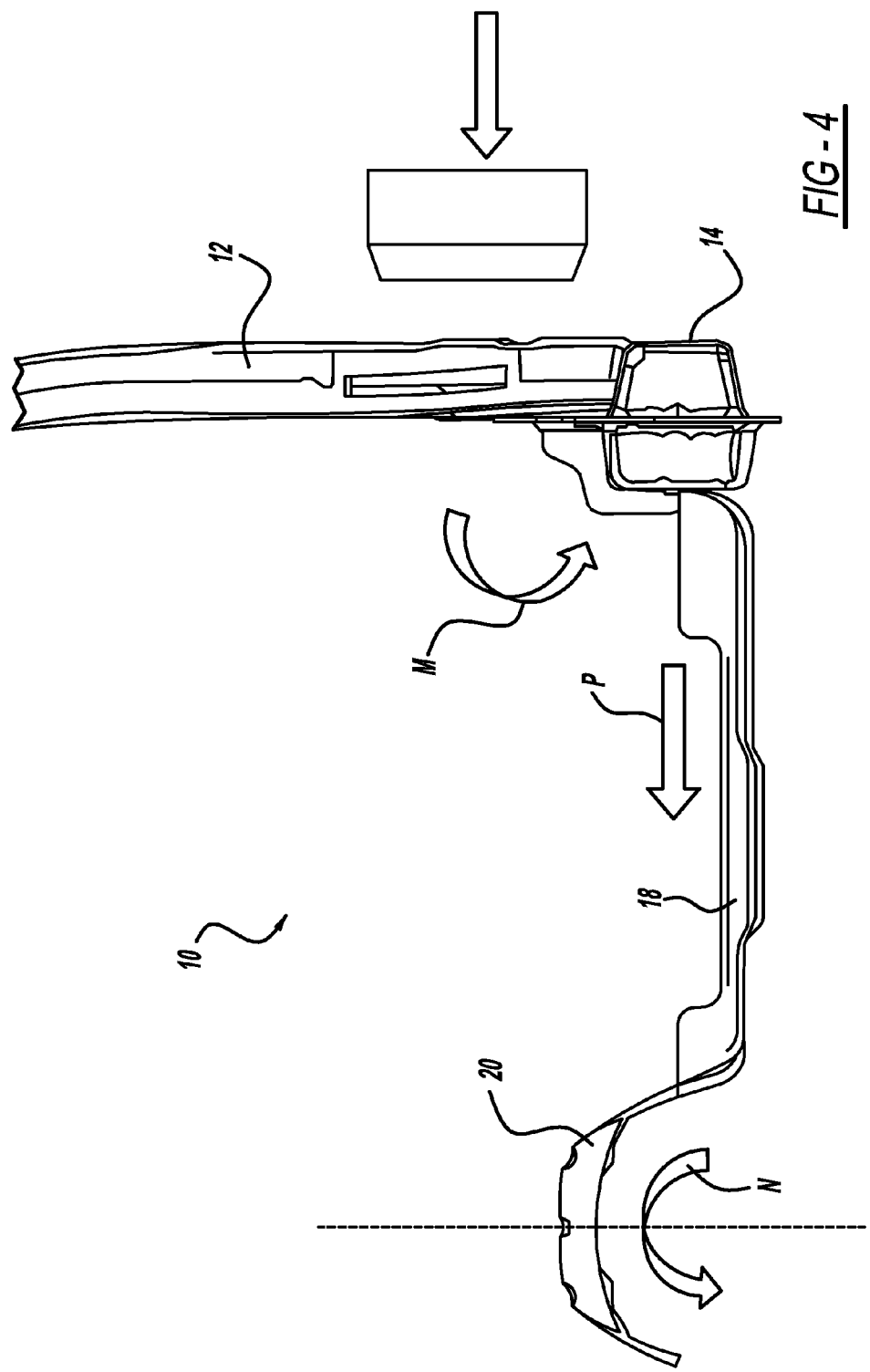
FIG. 4 is a sectional view of the load distributing structure of the disclosed invention taken along lines 4-4 of FIG. 2.

The cross-member 18 defines a primary load path which directs forces brought about by the barrier impact to the surrounding vehicle, thus minimizing deformation of one or more components of the load distributing structure 10. As a specific example, and referring to FIGS. 3 and 4, when the load distributing structure 10 of the vehicle is impacted by a barrier "B" (such as a vehicle bumper) the wide base 13 of the B-pillar 12 is directly impacted. According to the strategy of the primary load path, the wide base 13 and the rocker webbing 16 transfer force away from the B-pillar 12 and to cross-member 18, with the bending moment being about the rocker 14 as illustrated by the arrow "M".

The force received by the cross-member 18 is then transferred to the tunnel brace 20 as illustrated by the primary load path "P". The force received by the tunnel brace 20 is transferred around the tunnel as illustrated by the arrow "N" to the non-struck side of the vehicle (not shown).

While the cross-member 18 provides a primary load path one or more additional cross-members may be included to provide secondary load paths to help in the efficient and complete distribution of impact energy to the surrounding vehicle. This construction is particularly illustrated in FIGS. 1 and 2 in which an additional forward cross-member 30 and a rearward cross-member 32 are provided. Each of the cross-members 30 and 32 extend vehicle-inward from the rocker 14. Each of the cross-members 30 and 32 are also preferably composed of high strength steel and are more preferably composed of ultra-high strength steel. The forward cross-member 30 is preferably positioned in the vehicle to provide support to the front of the vehicle seat (not shown). The rearward cross-member 32 is preferably positioned in the vehicle to serve as the rear kick-up for the vehicle rear seat (not shown).

As noted above, the cross-member 18 functions as the primary load path in the event of a side impact, as illustrated by the arrow "P". The forward cross-member 30 functions as the secondary load path in the event of a side impact, as illustrated by the arrow "$S_1$". The rearward cross-member 32 functions as the secondary load path in the event of a side impact, as illustrated by the arrow "$S_2$". The positions and configurations of the cross-members 30 and 32 are only for illustrative purposes and it is to be understood that other positions and other configurations could be adopted without deviating from the spirit and scope of the disclosed invention.

Figure 5:
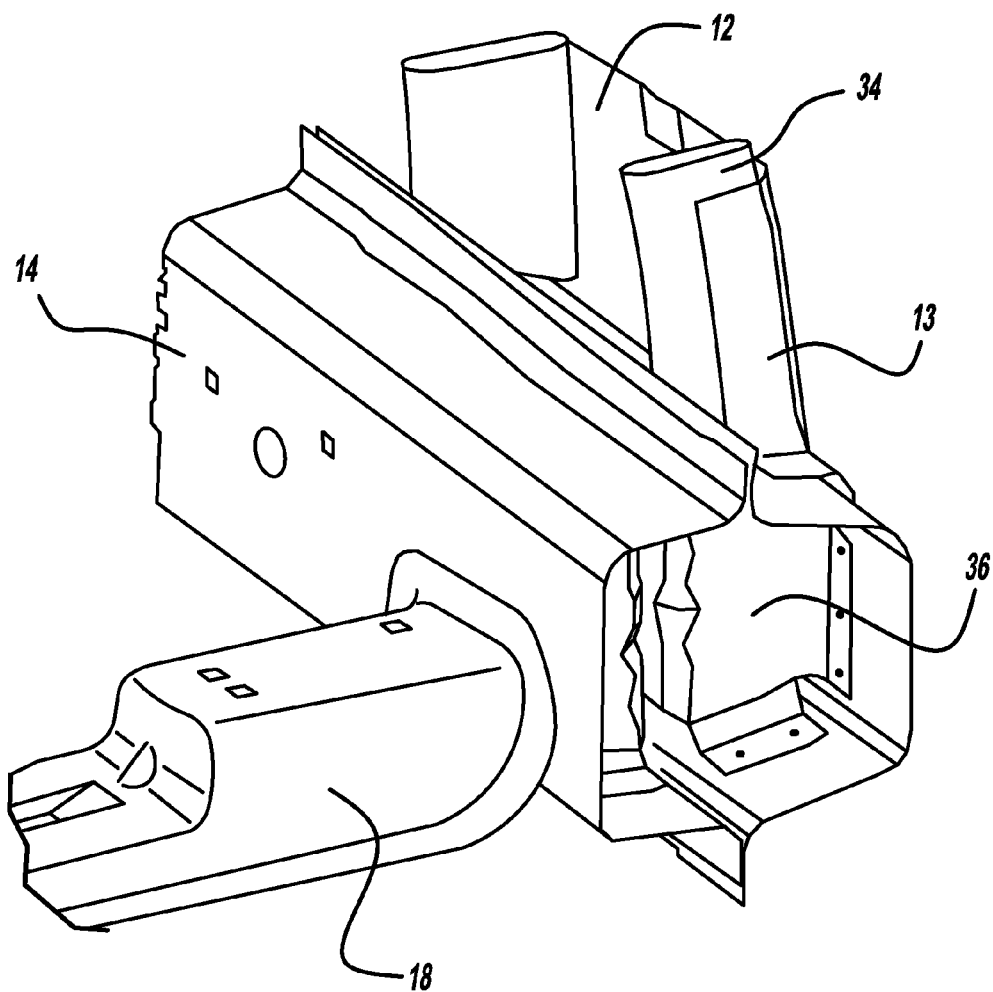
FIG. 5 is a perspective view of the base of the B-pillar and the rocker in partial section.

The disclosed invention includes a reinforced B-pillar 12 and a reinforced rocker 14. As illustrated in FIG. 5, a perspective view of the base of the B-pillar 12 is illustrated in partial section disclosing the tube structure of the B-pillar. Located internally within the B-pillar 12 is a strengthening structure in the form of a hollow tube 34 which extends from the rocker 14 to the vehicle roof (not shown). As illustrated, the hollow tube 34 is flattened, although other configurations of a tube may be adapted without deviating from the invention as disclosed. Further strengthening of the load distributing structure 10 is made possible by a strengthened rocker 14. According to the disclosed invention, an internal structure in the form of an internal bulkhead 36 is provided for strengthening. While the internal bulkhead 36 is shown in the form of a box structure other appropriate strengthening structures may be used as well. Both the hollow tube 34 and the internal bulkhead 36 further resist deformation of the load distributing structure 10 in the event of a side impact.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An energy distributing side structure for a vehicle comprising:
   a rocker having an internal bulkhead;
   a pillar attached to said rocker, said pillar having an internal reinforcing structure, said internal bulkhead of said rocker being adjacent said pillar;
   a reinforcing webbing attached to said rocker; and
   an energy transferring cross-member extending vehicle inward from said rocker, whereby said rocker, said pillar and said webbing can receive an impacting load which is transferred to said cross-member.

2. The energy distributing side structure of claim 1 wherein said pillar has a body and a base attached to said rocker, said base being wider than said body.

3. The energy distributing side structure of claim 1 wherein the vehicle includes a tunnel and wherein said cross-member connects to said tunnel.

4. The energy distributing side structure of claim 3 further including a tunnel brace to which said cross-member connects, said tunnel brace transferring said impacting load away from the impacted area.

5. The energy distributing side structure of claim 1 wherein said cross-member defines a primary load path.

6. The energy distributing side structure of claim 5 further including a second cross-member, said second cross-member defining a secondary load path.

7. The energy distributing side structure of claim 6 wherein the vehicle includes a tunnel and wherein said second cross-member extends between said rocker and said tunnel.

8. The energy distributing side structure of claim 7 further including a third cross-member, said third cross-member defining a secondary load path.

9. The energy distributing side structure of claim 8 wherein said pillar has a long axis and said internal reinforcing structure of said pillar is a tube extending along said long axis of said pillar.

10. An energy distributing side structure for a vehicle having a tunnel comprising:
- a rocker having internal reinforcement;
- a pillar attached to said rocker, said pillar having internal reinforcement;
- a reinforcing webbing connected to said rocker;
- a first cross-member extending vehicle inward from said rocker to the vehicle tunnel, said first cross-member defining a primary load path; and
- a second cross-member extending vehicle inward from said rocker, said second cross-member being spaced apart from said first cross-member and defining a secondary load path.

11. An energy distributing side structure for a vehicle comprising:
- a rocker having internal reinforcement;
- a pillar attached to said rocker, said pillar having internal reinforcement;
- a webbing connected to said rocker; and
- an energy transferring cross-member extending vehicle inward from said rocker, whereby energy from an impacting load is distributed to the surrounding vehicle thereby minimizing deformation of the vehicle.

12. The energy distributing side structure of claim 11 wherein said internal reinforcement of said rocker is an internal bulkhead.

13. The energy distributing side structure of claim 11 wherein said internal reinforcement of said pillar is a tubular structure.

14. The energy distributing side structure of claim 11 wherein the vehicle includes a tunnel and wherein said cross-member connects to said tunnel.

15. The energy distributing side structure of claim 14 further including a tunnel brace to which said cross-member connects, said tunnel brace transferring said impacting load away from the impacted area.

16. The energy distributing side structure of claim 11 wherein said cross-member defines a primary load path.

17. The energy distributing side structure of claim 16 further including a second cross-member, said second cross-member defining a secondary load path.

18. The energy distributing side structure of claim 17 wherein the vehicle includes a tunnel and wherein said second cross-member extends between said rocker and said tunnel.

19. The energy distributing side structure of claim 18 further including a third cross-member, said third cross-member defining a secondary load path.

20. The energy distributing side structure of claim 11 wherein said pillar has a long axis and said internal reinforcing structure of said pillar is a tube extending along said long axis of said pillar.

* * * * *